May 9, 1933.　　　　A. MOORHOUSE　　　　1,907,853
SPRING SUSPENSION FOR MOTOR VEHICLES
Filed March 8, 1929　　　2 Sheets-Sheet 1

Inventor:
ALFRED MOORHOUSE.

By Marks & Clerk
Attorneys

May 9, 1933.  A. MOORHOUSE  1,907,853
SPRING SUSPENSION FOR MOTOR VEHICLES
Filed March 8, 1929    2 Sheets-Sheet 2

INVENTOR:
ALFRED MOORHOUSE
BY Marks & Clark
ATTORNEYS.

Patented May 9, 1933

1,907,853

UNITED STATES PATENT OFFICE

ALFRED MOORHOUSE, OF DETROIT, MICHIGAN, ASSIGNOR, BY MESNE ASSIGNMENTS, TO MILTON TIBBETTS, OF DETROIT, MICHIGAN, AS TRUSTEE

SPRING SUSPENSION FOR MOTOR VEHICLES

Application filed March 8, 1929. Serial No. 345,502.

This invention relates to improvements in spring suspension means of a type principally adapted for use in connection with the spring suspension of motor vehicles, although the invention is not necessarily confined to this use and may be adapted with equal effectiveness for various other purposes.

One of the principal objects of the invention is the provision of a spring suspension arrangement which may be advantageously employed in connection with the spring suspension of the front end of motor vehicle chassis to avoid "shimmy" of the front wheels in accordance with the general theory and fundamental solution disclosed in the United States patent to P. Lemaigre No. 1,747,781, dated February 18, 1930.

A further object of the invention is to provide a range of universal full-floating movement of the suspension spring and front axle with respect to the chassis, at at least one side of the latter in accordance with the fundamental principle disclosed in the above identified patent of Lemaigre, which will increase the effectiveness with which the arrangement offsets and completely obviates tendency of the vehicle front wheels to shimmy during travel.

A further object of the invention is to so construct and mount the suspension spring that the twisting strains to which the spring leaves are subjected, as, for instance, when the lateral stability of the vehicle is violently upset, will be effectively absorbed and so distributed as to prevent the development of such local strains as frequently result in breakage.

A further object is to combine with a spring mounting of the above described character capable of universal movement a movement limiting device which, by proper adjustment, will variably limit under tension the displacement of the spring and front axle with respect to the chassis.

A further object is the provision of a spring suspension for motor vehicles which affords all of the foregoing characteristics in consequence of the simple expedient of coiling at least one terminal of the main leaf of the suspension spring about its point of connection to the vehicle chassis.

In the accompanying drawings wherein an approved embodiment of the invention is illustrated.

Figure 1:
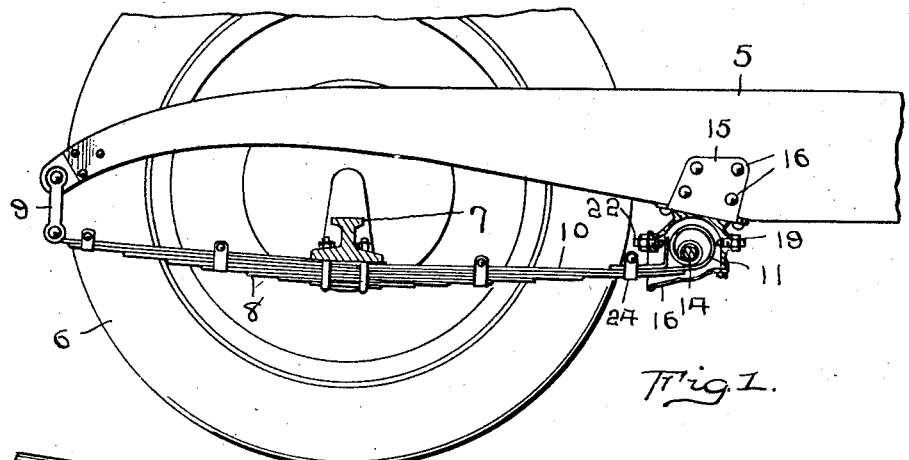
Fig. 1 is a fragmentary elevation, partly in section, of the front end of a motor vehicle illustrating the invention applied thereto.
Figures 2, 3:
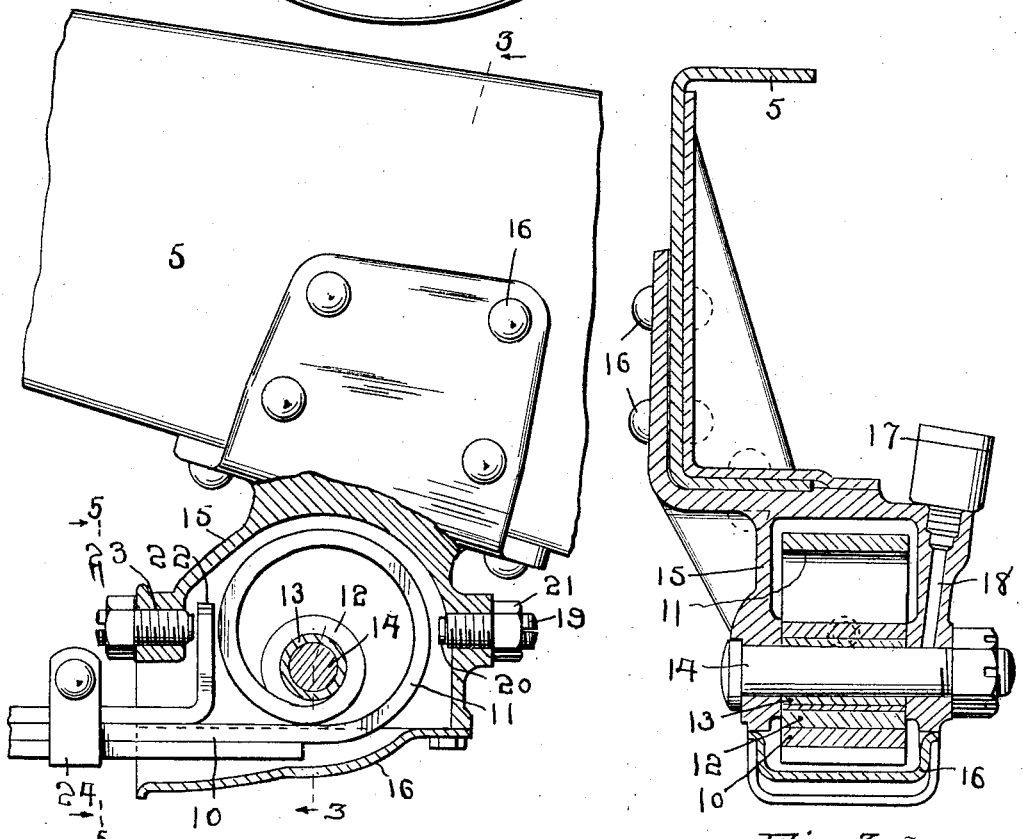
Fig. 2 is an enlarged detail section of the rear terminal of the suspension spring.
Fig. 3 is a detail section on the line 3—3 of Fig. 2.

Referring to the drawings in detail, the numerals 5 indicate the side members of the chassis of a motor vehicle supported at its front end on the front wheels 6, axle 7 and spring 8 connecting the axle 7 with the chassis members 5. Each spring 8 is of the multiple-leaf type, and in accordance with the invention the front end thereof is connected by shackle links 9 with the front terminal of the chassis member 5.

The rear terminal of the main leaf 10 of the spring is coiled in the form of a scroll 11 and the loop 12 at the extreme end thereof receives a bushing 13 movable upon a supporting bolt 14.

The bolt 14 passes transversely through and is anchored in a bracket 15 riveted or otherwise rigidly secured to the chassis member 5 as at 16. The bracket is of hollow form to accommodate and house the coiled terminal 11 of the main leaf of the spring, the bottom of the bracket being open to afford access to its interior and being normally closed by a cover plate 16. The front part of the bracket is open to receive the main and contiguous leaves of the spring 8.

Due to the weight of the vehicle the contiguous portions of the main leaf 10 and its coiled extremity 11 lying in vertical line with the axis of the bolt 14 normally lie in contact with one another. Due to the shape and inherent resiliency of the coiled extremity 11 the bolt 14 is normally retained between the opposed sides of the outermost or largest convolution of the coiled extremity 11.

Adequate means for insuring proper lubrication of the bolt and bushing 13 is provided as, for instance, by means of a lubrication container 17 communicating with a lubricating duct 18.

The dimensions of the hollow interior of the bracket 15 are such as to accommodate adequate expansion of the coiled extremity 11 of the main leaf, as well as displacement of the latter bodily in the vertical plane, as well as a turning or canting movement thereof laterally about an axis perpendicular to the axis of the retaining bolt 14. The displacement of the coiled extremity 11 rearwardly in the bracket 15, as well as the expansion of said extremity, is variably limited by an adjustable stop screw 19 the terminal of which is adapted to be engaged by the contiguous portion of the spring convolution 11 while the screw itself is secured in adjusted position by a lock nut 21. The forward displacement of the coiled portion of the main leaf is limited by one terminal of an angular stop member 22 coacting with a stop screw 23 identical with the screw 19. The opposite terminal of the angular stop member 22 is guided and confined by the spring clip 24 ordinarily provided for the proper positioning of the spring leaves.

The action of the spring under normal running conditions is similar to that of the ordinary vehicle spring, but it offers decided advantages thereover. First, when employed in connection with a spring suspension of the general type disclosed in the Lemaigre patent above referred to, and second, by virtue of the manner in which the rear terminal of the spring is connected with the chassis. Due to the construction and arrangement of the rear terminal of the spring the twisting strain to which the main leaf of the spring is subjected, as when one of the vehicle wheels drops into a hole in the roadway, is adsorbed by the coiled extremity 11 and distributed over a greater portion of the length of the spring than when the latter is connected by shackles in the usual manner to the chassis. This wide distribution of stress prevents undue loading or tensioning of local portions of the spring which frequently results in breakage and, as will be readily understood, the spring reacting under such conditions causes a twisting or turning of the coiled extremity 11 within the hollow bracket 15.

Although the extreme end of the spring is normally centered in the bracket 15 due to the inherent resiliency of the spring material, the spring itself is capable of longitudinal displacement both forwardly and rearwardly with respect to the bracket 15 under the tension of the coiled terminal 11 and limited by the adjustable stop screw 21 and stop member 22.

Figure 4:
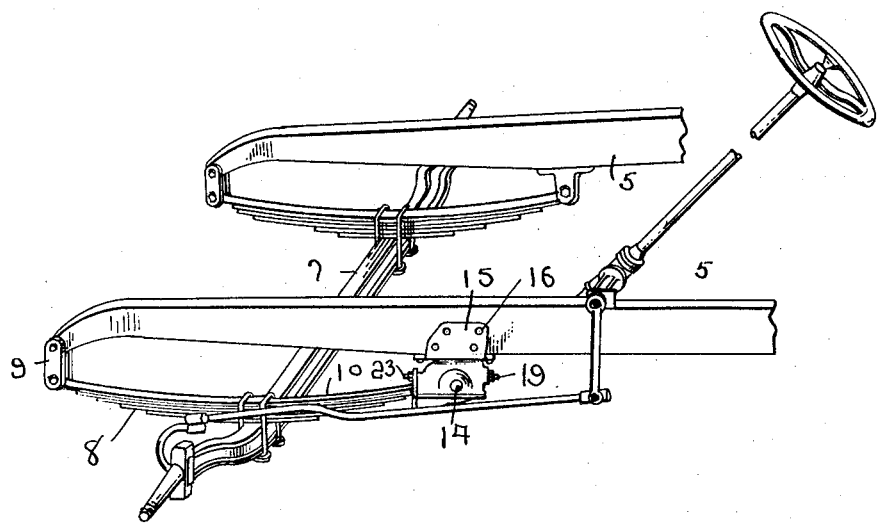
Fig. 4 is a fragmentary perspective view of the front part of a vertical chassis with the wheels removed and showing the invention applied thereto.
Figure 5:
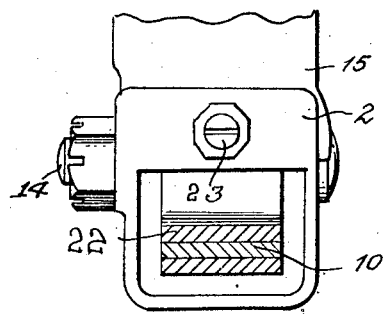
Fig. 5 is a fragmentary detail view on the line 5—5 of Fig. 2.

As above stated, the spring constructed in accordance with the present invention is particularly adapted for use in connection with spring suspension of the general type disclosed in the Lemaigre patent above identified, the adoption of the invention to this type suspension being illustrated in Fig. 4. When so used it is only necessary to curve one extremity of one spring which is located within the bracket 15 in order to produce the desired anti-shimmy effects of the Lemaigre spring suspension. The spring according to the present invention furthermore offers the additional advantage not present with the spring suspension of the Lemaigre patent of reducing liability of breakage due to twisting movement of the main spring leaf about an axis substantially parallel to the longitudinal axis of said leaf and also in providing additional freedom of movement under tension of the rear terminal of the spring with respect to the bolt 14.

What I claim is:

1. In combination, a frame, a spring connected at one end to the frame, and means pivotally connecting the opposite end of the spring to the frame, the last mentioned end of said spring being in the form of an open loop permitting displacement of the frame relative to the body of the spring and positioned to cause the application of the weight and load of the frame directly upon the body of the spring.

2. In combination, a frame, a spring connected at one end to the frame, and means pivotally connecting the opposite end of the spring to the frame, the last mentioned end of said spring being in the form of an open loop permitting universal movement of the frame relative to the body of the spring and positioned to cause the application of the weight and load of the frame directly upon the body of the spring.

3. In combination, a frame, a spring connected at one end to the frame, means connecting the opposite end of the spring to the frame, the last mentioned spring end being coiled about the point of connection to the frame to permit relative movement between the frame and spring and positioned to cause the application of the weight and load of the frame directly upon the body of the spring.

4. In combination, a frame, a spring connected at one end to the frame, means connecting the opposite end of the spring to the frame, the last mentioned end of the spring being in the form of an open convolution affording a clearance space to permit relative displacement of the spring and frame, the open convolution of the spring end lying above the body of the spring and positioned to cause the application of the weight and 5. In combination, a frame, a spring connected at one end to the frame, a pin-like member carried by the frame, the opposite end of the spring being in substantially coiled form and terminating in a loop embracing the pin-like member, said loop lying above the body of the spring and positioned to cause the application of the weight and load of the frame directly upon the body of the spring.

6. In combination, a frame, a spring connected at one end to the frame, a pin-like member carried by the frame, the opposite end of the spring passing under the pin-like member and being in substantially coiled form and terminating in a loop embracing the pin-like member, the convolution of the coiled portion of the spring normally lying in spaced relation to the loop terminal to provide a clearance to accommodate relative displacement of the frame and spring and positioned to cause the application of the weight and load of the frame directly upon the body of the spring.

7. In combination, a frame, a spring connected at one end to the frame, a pin-like member carried by the frame, the opposite end of the spring being in substantially coiled form and terminating in a loop embracing the pin-like member, the convolution of the coiled portion of the spring normally lying in spaced relation to the looped terminal to provide a clearance to accommodate relative displacement of the frame and spring, the portions of the spring including the coiled terminal thereof lying in a vertical plane below the pin-like member being normally disposed in contact to transmit the load of the frame to the body of the spring.

8. In combination, a frame, a spring connected at one end thereto, a connecting member, and the adjacent portion of the spring being in the form of an open loop permitting twisting movement of the body of the spring about an axis substantially parallel to the longitudinal axis of the spring body and positioned to cause application of the weight and load of the frame directly upon the body of the spring.

9. In combination, a frame, a spring connected at one end thereto, a connecting member, and the adjacent portion of the spring being in the form of an open loop permitting twisting movement of the body of the spring about an axis substantially parallel to the longitudinal axis of the spring body and also permitting relative displacement of the spring and frame in the longitudinal direction of the latter and positioned to cause application of the weight and load of the frame directly upon the body of the spring.

10. In combination, a frame, a spring, a connecting member between the frame and spring disposed substantially perpendicularly to the longitudinal axis of the spring, the portion of the spring adjacent the connecting member being in the form of an open loop to accommodate twisting movement of the body of the spring about an axis substantially parallel to the longitudinal axis of the spring body and positioned to cause application of the weight and load of the frame directly upon the body of the spring.

11. In combination, a connecting member, a spring having one terminal engaged with the connecting member and the adjacent portion in the form of a loop, and means for limiting the expanding movement of the looped portion of the spring.

12. In combination, a frame, a spring, a connecting member, one terminal of the spring being engaged with the connecting member and the adjacent portion of the spring being substantially in the form of a coil permitting displacement of the connecting member with respect to the body of the spring, and means for limiting the displacement of the coiled portion of the spring bodily with respect to the connecting member.

13. In combination, a frame, a spring, a connecting member, one terminal of the spring being engaged with the connecting member and the adjacent portion of the spring being substantially in the form of a coil permitting displacement of the connecting member with respect to the body of the spring, and means for limiting the displacement of the coiled portion of the spring bodily with respect to the connecting member and for limiting the expanding movement of said coiled portion.

14. In combination, a frame, a spring, a connecting member, one terminal of the spring being engaged with the connecting member and the adjacent portion of the spring being substantially in the form of a coil permitting displacement of the connecting member with respect to the body of the spring, and means for variably limiting the displacement of the coiled portion of the spring bodily with respect to the connecting member.

15. In combination, a frame, a spring, a connecting member, one terminal of the spring being engaged with the connecting member and the adjacent portion of the spring being substantially in the form of a coil permitting displacement of the connecting member with respect to the body of the spring, and means for variably limiting the displacement of the coiled portion of the spring bodily with respect to the connecting member and for variably limiting the expanding movement of said coiled portion.

16. In combination, a bracket, a connecting member carried by the bracket, a spring having one terminal engaged with the connecting member and the adjacent portion coiled in an open convolution about the connecting member said coil portion being arranged to transmit loads imposed on the bracket directly to the spring.

17. In combination, a bracket, a connecting member carried by the bracket, a spring having one terminal engaged with the connecting member and the adjacent portion coiled in an open convolution about the connecting member, and means carried by the bracket for variably limiting the displacement of the coiled portion of the spring relative to the bracket.

18. In combination, a bracket, a connecting member carried by the bracket, a spring having one terminal engaged with the connecting member and the adjacent portion coiled in an open convolution about the connecting member, and opposed members arranged to limit the movement of the coiled portion of the spring bodily and during expansion.

19. In combination, a bracket, a connecting member carried by the bracket, a spring terminally engaged with the connecting member and having the adjacent portion in the form of an open convolution, a movable stop member engageable with the open convolution of the spring and means variably limiting the movement of the stop member to restrain the expansion and body movements of the coiled portion of the spring.

20. In combination, a vehicle chassis including side members and an axle, springs arranged between the axle and the respective side members of the chassis, means mounting one of the springs to move about a fixed axis with respect to its side member, and means connecting at least one end of the other spring with the other side member and permitting substantially universal relative movement between the spring and side member under tension.

21. In combination, a motor vehicle chassis including side members and an axle, springs interposed between the axle and chassis members, pivotal connections between the spring at one side of the chassis and the adjacent side member, and means connecting the other spring with the other chassis side member, the last mentioned means permitting substantially universal movement of at least one end of the spring with respect to the adjacent chassis member.

In testimony whereof I affix my signature.

ALFRED MOORHOUSE.